US011179980B2

(12) United States Patent
Spindler et al.

(10) Patent No.: US 11,179,980 B2
(45) Date of Patent: Nov. 23, 2021

(54) TIRE PRESSURE CONTROL SYSTEM AND COMPONENTS

(71) Applicants: ILLINOIS TOOL WORKS INC., Glenview, IL (US); KT PROJEKTENTWICKLUNGS GMBH, Heilbronn (DE)

(72) Inventors: Martin P. Spindler, Herdwangen (DE); Konstantinos Tsiberidis, Heilbronn (DE)

(73) Assignees: ILLINOIS TOOL WORKS INC., Glenview, IL (US); KT PROJEKTENTWICKLUNGS GMBH, Heilbronn (DE)

( * ) Notice: Subject to any disclaimer, the term of this patent is extended or adjusted under 35 U.S.C. 154(b) by 573 days.

(21) Appl. No.: 16/068,002

(22) PCT Filed: Dec. 22, 2016

(86) PCT No.: PCT/US2016/068335
§ 371 (c)(1),
(2) Date: Jul. 3, 2018

(87) PCT Pub. No.: WO2017/120062
PCT Pub. Date: Jul. 13, 2017

(65) Prior Publication Data
US 2019/0009623 A1   Jan. 10, 2019

(30) Foreign Application Priority Data

Jan. 4, 2016 (DE) .................... 10 2016 000 043.0
May 25, 2016 (DE) .................... 10 2016 006 473.0

(51) Int. Cl.
*B60C 29/06* (2006.01)
*B60C 29/00* (2006.01)
*B60C 23/00* (2006.01)

(52) U.S. Cl.
CPC .......... *B60C 29/068* (2013.01); *B60C 29/005* (2013.01); *B60C 23/003* (2013.01)

(58) Field of Classification Search
CPC ..... B60C 29/00; B60C 29/002; B60C 29/005; B60C 29/02; B60C 29/04; B60C 29/068; F16K 15/20; F16K 15/207
See application file for complete search history.

(56) References Cited

U.S. PATENT DOCUMENTS 2,506,677 A   5/1950   McKenna
4,657,289 A   4/1987   Boyer
(Continued)

FOREIGN PATENT DOCUMENTS

CN   2806819 Y     8/2006
CN   201715037 U   1/2011
(Continued)

OTHER PUBLICATIONS

European Patent Office, English language version of a European Office Action for European Application No. 16774754.2 (EPO Forms 2001 and 2906), dated May 11, 2020 (7 pages).

*Primary Examiner* — Jason R Bellinger
(74) *Attorney, Agent, or Firm* — Pauley Erickson & Swanson

(57) ABSTRACT

A tire valve for controlled filling and emptying of a tire, having a valve body and a filling conduit, which is routed in the valve body from a valve inlet to a valve outlet and in which a filling valve is provided. In order to be able to perform an emptying of the tire, an emptying conduit, which is separated from the filling conduit in a pressure-tight manner, is formed in the valve body and includes an emptying valve, and from this emptying conduit an emptying opening leads through the valve body to the outside, wherein a shut-off element of the emptying valve is coupled to an element, which is movable by pressure medium
(Continued)

loading, in such a way that a movement of the movable element, which is brought about by the pressure medium loading in the filling conduit, moves the shut-off element of the emptying valve into an open position.

15 Claims, 5 Drawing Sheets

(56) References Cited

U.S. PATENT DOCUMENTS

| | | | | |
|---|---|---|---|---|
| 4,869,306 | A | * | 9/1989 | Keys ................ B60C 29/06 152/427 |
| 5,174,728 | A | | 12/1992 | Kimura et al. |
| 5,325,902 | A | | 7/1994 | Loewe et al. |
| 5,694,969 | A | * | 12/1997 | DeVuyst ............ B60C 29/06 137/226 |
| 6,354,348 | B1 | * | 3/2002 | Taillandier ......... B60C 17/02 152/339.1 |
| 6,772,812 | B1 | * | 8/2004 | Hamilton ........... B60C 23/004 137/224 |
| 9,937,760 | B2 | * | 4/2018 | Austin ............... B60C 29/068 |
| 2004/0216806 | A1 | | 11/2004 | Eckhardt |
| 2009/0283191 | A1 | | 11/2009 | Isono |
| 2010/0065177 | A1 | | 3/2010 | Saadat |
| 2011/0277877 | A1 | | 11/2011 | Stehle |

FOREIGN PATENT DOCUMENTS

| | | |
|---|---|---|
| CN | 104024007 A | 9/2014 |
| EP | 0 937 590 A1 | 8/1999 |
| EP | 1 908 612 A1 | 4/2008 |
| FR | 2 835 304 A1 | 8/2003 |
| JP | 62-4617 A | 1/1987 |
| JP | 2005-515923 | 6/2005 |
| JP | 2008-223604 | 9/2008 |
| JP | 2010-517839 | 5/2010 |
| WO | WO 02/36369 A1 | 5/2002 |
| WO | WO 2013/037052 A1 | 3/2013 |
| WO | WO 2015/075655 A1 | 5/2015 |

* cited by examiner

TIRE PRESSURE CONTROL SYSTEM AND COMPONENTS

CROSS REFERENCE TO RELATED APPLICATION

This application is a National Phase application of PCT International Patent Application PCT/US2016/068335, filed on 22 Dec. 2016.

BACKGROUND OF THE INVENTION

Field of the Invention

The present invention generally relates to the field of adjusting the pressure in tires by means of tire valves and in particular, relates to a tire valve with which it is possible to carry out a controlled filling and emptying of a tire.

SUMMARY OF THE INVENTION

Tire valves are generally used to fill tires with a pressure medium such as compressed air. In vehicles such as passenger cars, trucks, or commercial vehicles, tire valves are usually positioned in the region of a rim on which the tire is mounted so that they are easily accessible from the outside. A pressure medium source external to the vehicle can be connected to the tire valve, for example by means of a hose line, in order to thus be able to check the tire pressure and correct it as needed.

In addition, there are known vehicle-mounted pressure medium supply systems that also enable an autonomous filling of the tires with pressure medium. To this end, pressure medium lines are routed from a pressure medium source provided in the vehicle, for example a compressor or pressure reservoir, to the wheels and are connected to the tire valves there. At the transition from the vehicle frame to the wheels, so-called rotary feedthroughs are used, which enable a filling with pressure medium to also take place while driving, i.e. when the wheels are turning. In this way, it is possible for the tire pressure to be adapted, for example, to altered load conditions, road surfaces, and ambient temperatures.

Conventional tire valves are usually embodied as simple check valves and therefore permit only a controlled filling of a tire by means of a corresponding supply of pressure medium. These valves generally have to be manually actuated in order to empty the tire. Particularly with autonomous pressure medium supply systems, it is therefore not possible to release pressure medium from the tires while driving in order to perform a possibly needed reduction in tire pressure.

The object of the invention, therefore, is to disclose an embodiment that enables a controlled filling and emptying of a tire by means of a single tire valve.

According to a first aspect, this object is attained by a tire valve for a controlled filling and emptying of a tire, the tire valve having a valve body and a filling conduit, which is routed in the valve body from a valve inlet to a valve outlet and in which a filling valve is provided. The tire valve features the fact that an emptying conduit, which is separated from the filling conduit in a pressure-tight manner, is formed in the valve body and includes an emptying valve, and from this emptying conduit, an emptying opening leads through the valve body to the outside, wherein a shut-off element of the emptying valve is coupled to an element, which is movable by means of pressure medium loading in such a way that a movement of the movable element, which is brought about by means of pressure medium loading in the filling conduit, moves the shut-off element of the emptying valve into an open position.

The valve inlet constitutes the part of the tire valve via which the tire valve communicates with a pressure medium line or is connected to it in a fluid-carrying manner when the pressure medium line is connected to the tire valve. Pressure medium that is conveyed through the pressure medium line can flow into the tire valve by means of the valve inlet. Incoming pressure medium travels from the valve inlet into the filling conduit until it comes into contact with the filling valve situated in the filling conduit. If the filling valve is in a closed position, then the pressure medium is stopped at the filling valve and does not travel further to the valve outlet that leads into the tire.

The valve outlet therefore constitutes the part of the tire valve via which the tire valve, when mounted, communicates with the inside of the tire or is connected to it in a fluid-carrying manner. Through the valve outlet, pressure medium can travel from the tire to the filling valve of the tire valve so that the internal pressure of the tire is present on the one side of the filling valve (hereinafter referred to as "tire pressure") and the pressure in the filling conduit is present on the other side of the filling valve. The tire pressure (optionally assisted by a spring force) pushes a shut-off element of the filling valve into a closed position.

The filling valve can be opened by increasing the pressure in the filling conduit to a pressure level that is sufficient to move the shut-off element of the filling valve from its closed position into an open position (this pressure, which depends on the tire pressure, is referred to hereinafter as "filling pressure"). In the open position, the pressurized pressure medium in the filling conduit can pass the filling valve and flow into the tire via the valve outlet. The tire is thus filled with pressure medium, correspondingly increasing the tire pressure. In other words, the filling valve is controlled by means of a pressure medium loading, which moves the filling valve from a closed position into an open position. The filling valve can also be referred to as an intake valve.

The emptying conduit, which is formed in the valve body and is separated from the filling conduit in a pressure-tight manner, can be used for reducing the tire pressure, i.e. for releasing pressure medium from the tire. When the tire valve is installed, pressure medium, similarly to what happens with the filling valve, can travel out of the tire via the valve outlet to the emptying valve so that the tire pressure is present on this side of the emptying valve and (optionally assisted by a spring force) pushes a shut-off element of the emptying valve into a closed position. If the emptying valve is in a closed position, no pressure medium can travel out of the tire into the emptying conduit. But if the emptying valve is in an open position, then pressure medium contained in the tire can pass through the emptying valve and travel into the emptying conduit and flow out through the emptying opening that is routed through the valve body. In this way, pressure medium is allowed to exit the tire, correspondingly reducing the tire pressure. The emptying valve can also be referred to as an outlet valve.

The emptying valve, similarly to the filling valve, can be controlled by means of a pressure medium loading, which forces the emptying valve out of a closed position into an open position. Since the emptying conduit, however, is not fluidically connected to the valve inlet and is separated from the filling conduit in a pressure-tight manner, the emptying valve cannot easily be loaded with pressure medium that is supplied to the tire valve via the pressure medium line. Instead, a coupling between the shut-off element of the emptying valve and the movable element is provided in such a way that a movement of the movable element brought about by a pressure medium loading in the filling conduit is able to move the shut-off element of the emptying valve into an open position. More precisely stated, the emptying valve can be opened by increasing the pressure in the filling conduit to a pressure level that is suitable for moving the shut-off element of the emptying valve, which is coupled to the movable element, from a closed position into an open position (this pressure is referred to hereinafter as "emptying pressure").

In this way, the tire valve can be controlled by applying a corresponding pressure in the filling conduit, both for filling and emptying the tire. In this connection, the pressure level of the emptying pressure and the pressure level of the filling pressure can differ from each other. For example, the pressure level of the emptying pressure can be lower than the pressure level of the filling pressure. In this case, when the emptying pressure is applied, at first only the emptying valve opens while the filling valve continues to remain closed.

Such different pressure levels for the emptying pressure and the filling pressure can be implemented in that the respective pressure medium loading surfaces (i.e. the pressure-affected surfaces) of the movable element and of the shut-off element of the filling valve are of different sizes. For example, in order to set the pressure level of the emptying pressure lower than the pressure level of the filling pressure, the movable element can have a larger pressure medium loading surface than the shut-off element of the filling valve. Based on the relation pressure equals force per unit area (P=F/A), with a certain pressure prevailing in the filling conduit, a greater force is exerted on the movable element than on the shut-off element of the filling valve. Consequently moving the shut-off element of the emptying valve, which is coupled to the movable element, into an open position takes less pressure than is required to move the shut-off element of the filling valve into an open position.

The movable element that is coupled to the shut-off element of the emptying valve can be embodied in different ways. For example, the movable element can be embodied as a deformable element. The movement of the movable element that is brought about by the pressure medium loading in the filling conduit can then result from a deformation of the movable element. For example, the movable element can be an elastic diaphragm, which separates the emptying conduit from the filling conduit in a pressure-tight manner. When a pressure medium loading occurs, the elastic diaphragm can deform in such a way that it moves a coupling element, which is coupled to the shut-off element of the emptying valve, so that the shut-off element of the emptying valve is brought into an open position. It is likewise conceivable for the movable element to be embodied as a slidable element. The movement of the movable element that is brought about by a pressure medium loading in the filling conduit can then result from a sliding of the movable element. For example, the movable element can be a piston that separates the emptying conduit from the filling conduit in a pressure-tight manner. When a pressure medium loading occurs, the piston can slide so that it moves a coupling element coupled to the shut-off element of the emptying valve and as a result, the shut-off element of the emptying valve is brought into an open position.

The emptying valve and/or the filling valve generally each be embodied as a check valve; the check valve can, for example, be a ball check valve or a disc check valve. It is understood that other suitable valve types can also be used for implementation of the emptying valve and/or filling valve.

If, as described above, the emptying pressure is lower than the filling pressure, then the filling valve can only be opened when a pressure corresponding to the filling pressure is applied in the filling conduit. In this case, in order to ensure that in the open position of the filling valve, the emptying valve is not also simultaneously opened, the tire valve can have a shut-off device that is equipped to hold the emptying valve in a closed position when the filling valve assumes an open position. Alternatively or additionally, the shut-off device can also be equipped to hold the filling valve in a closed position when the emptying valve assumes an open position.

The shut-off device can, for example, include a corresponding shut-off element for the emptying valve, which is coupled to the movable element so that a movement of the movable element, which is brought about by a pressure medium loading in the filling conduit, moves the corresponding shut-off element of the emptying valve into a closed position when the pressure medium loading (corresponding to the filling pressure) is more powerful than the pressure medium loading that opens the emptying valve (corresponding to the emptying pressure).

The corresponding shut-off element can, for example, be positioned on a side of a valve opening of the emptying valve opposite from the shut-off element so that the valve opening of the emptying valve is closed by the shut-off element (corresponding to a first closed position) at a lower pressure than the emptying pressure, is opened at a pressure that corresponds to the emptying pressure (corresponding to an open position in which neither the shut-off element nor the corresponding shut-off element closes the valve opening), and is closed by the corresponding shut-off element (corresponding to a second closed position) at a pressure that corresponds to the filling pressure. The emptying valve can then be brought from the first closed position into an open position through application of an emptying pressure in the filling conduit. If the pressure in the filling conduit is then increased to the pressure level of the filling pressure, then the emptying valve is brought into the second closed position, with the filling valve simultaneously being moved into an open position so that a filling of the tire can take place. The corresponding shut-off element can be coupled to the same coupling element, which also connects the shut-off element to the movable element.

The shut-off device can also include an electromagnetically actuatable switchover device, which is equipped to hold the emptying valve in a closed position when the filling valve assumes an open position, and/or to hold the filling valve in a closed position when the emptying valve assumes an open position. Compared to the variant described above, an electromagnetically assisted shut-off device makes it possible to fill and empty the tire with one and the same pressure level instead of with the aid of different pressure levels for the emptying pressure and the filling pressure. In addition, in the variant described above it is also necessary when emptying to maintain the pressure in the filling conduit at or in a particular pressure level or pressure range (that corresponds to the emptying pressure) for a longer time in order to hold the emptying valve in the open position and to thus permit a continuous discharging of pressure medium from the tire. With conventional compressors or pressure reservoirs provided in the vehicle, however, it is difficult to produce the steady pressure medium supply at a constant pressure level that is required for this. The electromagnetically actuatable shut-off device makes it possible to perform the filling and emptying of the tire even with varying (unstable) pressure levels since it can hold the emptying valve securely in a closed position while the tire is being filled and can hold the filling valve securely in a closed position while the tire is being emptied.

The electromagnetically actuatable switchover device can, for example, be equipped to selectively shut off a pressure medium loading of the filling valve or a pressure medium loading of the movable element. To this end, the filling conduit can be divided into a first part associated with the filling valve and a second part associated with the movable element, it being possible for these parts to be separated from each other in a pressure-tight manner by means of a shut-off element. The electromagnetically actuatable switchover device can selectively bring the shut-off element into a first position in which a pressure medium supply into the first part of the filling conduit is shut off or into a second position in which a pressure medium supply into the second part of the filling conduit is shut off. The shut-off element can, for example, be embodied in the form of a pivotable flap positioned in the filling conduit, which flap selectively shuts off the first or second part of the filling conduit and closes it off from the respective other part in a pressure-tight manner.

The electromagnetically actuatable switchover device can also be equipped to selectively boost a closing force of the filling valve or a closing force of the emptying valve. If, for example, the closing force of the filling valve is assisted by a spring device, then the electromagnetically actuatable switchover device can be equipped to boost a spring force produced by the spring device. This applies analogously to the closing force of the emptying valve. It is also conceivable for the electromagnetically actuatable switchover device to be equipped to lock the shut-off element of the filling valve in a closed position or to lock the shut-off element of the emptying valve in a closed position so that the shut-off elements can no longer move out of their respective closed positions until they are unlocked again.

With the tire valve described above, the emptying valve is basically controlled by means of a pressure medium loading in the filling conduit and the electromagnetically actuatable switchover device is only used for assisting the control. Basically, though, it is also conceivable to achieve a controlled emptying of the tire without a pressure medium loading in the filling conduit and solely with the aid of an electromagnetically actuatable switching mechanism.

According to a second aspect, the object mentioned at the beginning is also attained by means of a tire valve for controlled filling and emptying of a tire; the tire valve has a valve body and a filling conduit, which is routed in the valve body from a valve inlet to a valve outlet and in which a filling valve is provided. The tire valve includes an electromagnetically actuatable switching mechanism, which is equipped to selectively close or open an emptying opening that leads through the valve body to the outside.

Compared to the above-described tire valve according to the first aspect, this tire valve does not require an independent emptying conduit that is separated from the filling conduit in a pressure-tight manner. In this case, the emptying opening that leads through the valve body to the outside can be positioned in a region of the tire valve, which, when the tire valve is installed, communicates with the inside of the tire or is connected to it in a fluid-carrying manner. Pressure medium that is present in the tire can then be discharged from the tire in a controlled manner by an electromagnetically actuated opening of the emptying opening.

Both the electromagnetically actuatable switchover device of the tire valve according to the first aspect and the electromagnetically actuatable switching mechanism of the tire valve according to the second aspect require a corresponding triggering and power supply. This requires additional features that are described below. These features relate to both the tire valve according to the first aspect and the tire valve according to the second aspect.

The tire valve can have a signal line connector for connecting to a signal line. The signal line can be an electrical line, which is suitable for transmitting control signals and data and for supplying power. The signal line connector can, for example, be positioned on an outside of the valve body and be embodied to be connected (e.g. by means of a plug connection) to a signal line that is routed to a tire valve. If the signal line is integrated into a pressure medium line connected to the tire valve, the signal line connector can also be positioned in the region of the valve inlet and embodied to be automatically connected to the signal line that is routed in the pressure medium line when the connection is produced between the tire valve and the pressure medium line. This can, for example, be carried out in that a pressure medium line connector of the tire valve provided for being connected to the pressure medium line is provided with contacts that come into contact with corresponding contacts of the pressure medium line when the pressure medium line is properly connected to the pressure medium line connector of the tire valve. For example, the contacts can be positioned in the region of a thread of the tire valve and the corresponding contacts can be positioned on an end piece of the pressure medium line that can be screwed onto the thread and they come into contact with one another when the end piece is screwed onto the thread.

If an electromagnetically actuatable switchover device or electromagnetically actuatable switching mechanism is provided on the tire valve, then the switchover device or switching mechanism can be connected to the signal line via the signal line connector. In the tire valve, a line can be provided (e.g. routed in a wall of the valve body), which connects the switchover device or switching mechanism to the signal line connector.

The tire valve can also include a sensor in the region of the valve outlet, which can be connected to the signal line via the signal line connector. For example, the sensor can be a pressure sensor, a temperature sensor, or a combined pressure/temperature sensor. In the tire valve, a line can be provided (e.g. routed in a wall of the valve body), which connects the sensor to the signal line connector.

The sensor and/or the electromagnetically actuatable switchover device or electromagnetically actuatable switching mechanism can be connected via the signal line to a control unit and can be supplied with the necessary electrical power and corresponding control signals by the control unit. The sensor can transmit measurement data to the control unit via the signal line. Alternatively, measurement data can be transmitted to the control unit wirelessly. The control unit can be a control unit of a pressure medium supply unit provided in the vehicle, which can determine a required pressure adaptation in the tire, for example taking into account the measurement data received from the sensor, and can issue instructions for a corresponding adaptation of the tire pressure.

If a tire pressure increase is required, the control unit can, for example, trigger a compressor provided in the vehicle to compress pressure medium to a level of the filling pressure and to convey the compressed pressure medium via the tire valve and into the tire. If necessary, the control unit, when a tire valve according to the first aspect is used, can simultaneously trigger the electromagnetically actuatable switchover device in order to ensure that the emptying valve remains closed during the filling.

If a tire pressure reduction is required, the control unit, when a tire valve according to the first aspect is used, can trigger the compressor provided in the vehicle to compress pressure medium to a level of the emptying pressure, convey it to the tire valve in order to open the emptying valve of the tire valve, and discharge pressure medium from the tire in a controlled manner. If necessary, the control unit can simultaneously also trigger the electromagnetically actuatable switchover device in order to ensure that the filling valve remains closed during the emptying. When a tire valve according to the second aspect is used, the control unit only needs to trigger the electromagnetically actuatable switching mechanism of the tire valve so that its emptying opening is opened and thus pressure medium can be discharged from the tire in a controlled manner.

BRIEF DESCRIPTION OF SEVERAL VIEWS OF THE DRAWINGS

Several exemplary embodiments of a tire valve according to the invention will be explained in greater detail below with reference to the accompanying schematic drawings. In the drawings.

DETAILED DESCRIPTION OF THE INVENTION

Figure 1C:
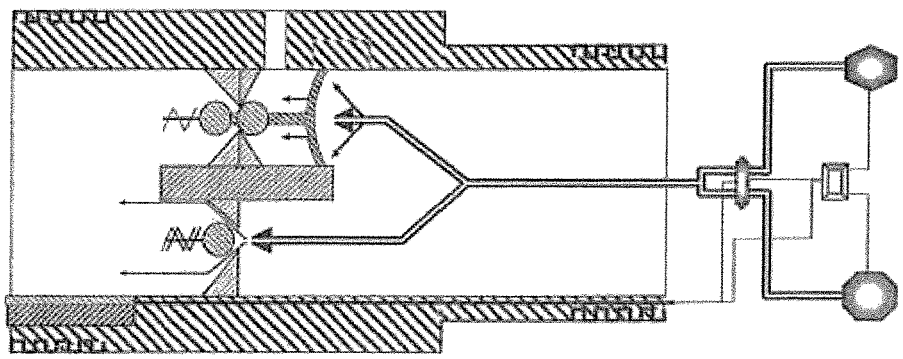
FIG. 1c shows a third schematic sectional views of a tire valve with an emptying valve, which has a shut-off element and a corresponding shut-off element.

In the following description of exemplary embodiments, elements that are the same or function in the same way have been provided with the same reference numerals.

Figure 1B:
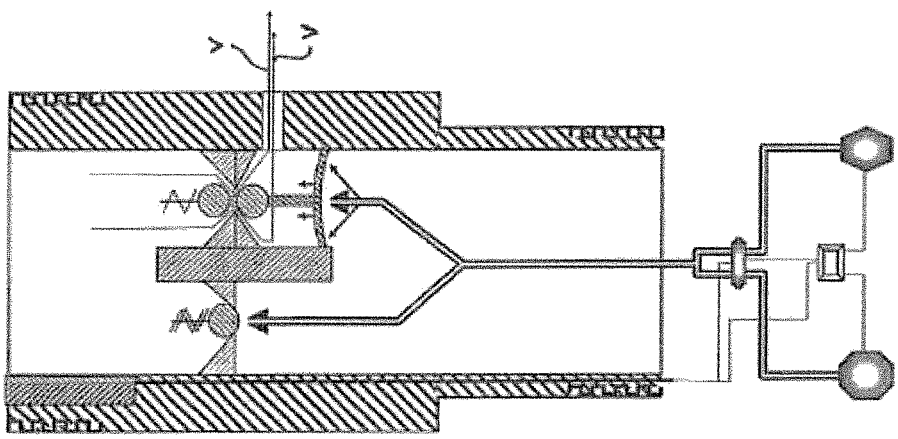
FIG. 1b shows a second schematic sectional views of a tire valve with an emptying valve, which has a shut-off element and a corresponding shut-off element.
Figure 1A:
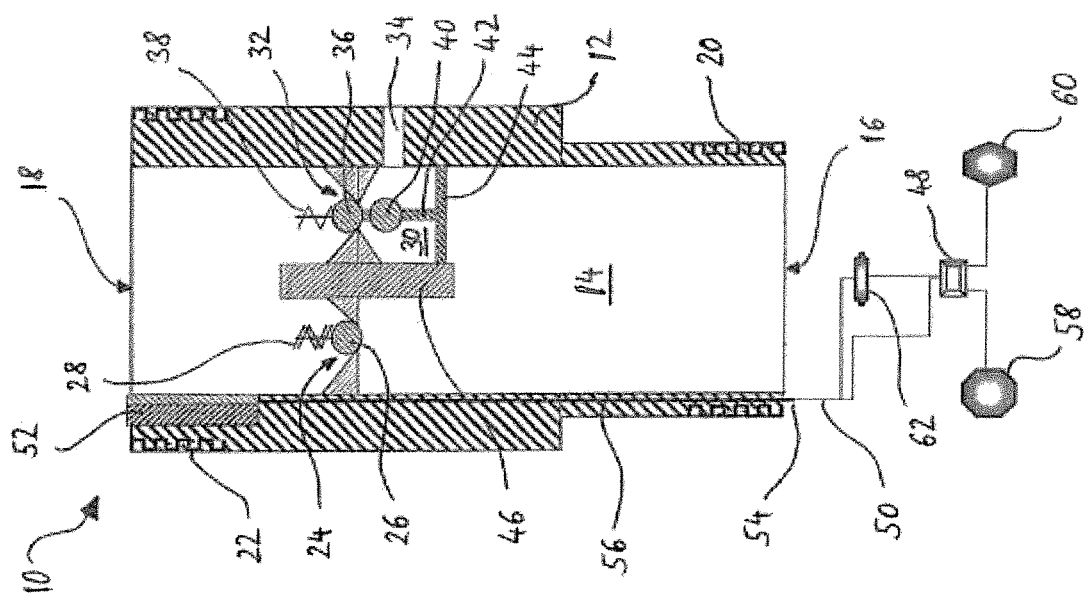
FIG. 1a shows a first schematic sectional views of a tire valve with an emptying valve, which has a shut-off element and a corresponding shut-off element.

FIG. 1 shows a schematic sectional view of a tire valve 10 according to a first exemplary embodiment. In FIG. 1a, the tire valve 10 is shown in the normal state; in FIG. 1b, it is shown in a state during the emptying; and in FIG. 1c, it is shown in a state during the filling of a tire (not shown here). The tire valve 10 includes a valve body 12, in which a filling conduit 14 is routed from a valve inlet 16 to a valve outlet 18. The valve inlet 16 constitutes the part of the tire valve 10 via which the tire valve 10 communicates with a pressure medium line (not shown here) or is connected to it in a fluid-carrying manner. The valve outlet 18 constitutes the part of the tire valve 10 via which the tire valve 10 communicates with the inside of the tire or is connected to it in a fluid-carrying manner. In the region of the valve inlet 16, a thread 20 is shown, which constitutes a pressure medium line connector of the tire valve 10. By means of the thread 20, the tire valve can be screw-connected to an end piece of the pressure medium line. In the region of the valve outlet 18, a thread 22 is shown, which constitutes a connector oriented toward the tire, by means of which the tire valve 10 is fastened, for example, to vehicle rim on which the tire is mounted, in order to be connected in a fluid-carrying manner to the inside of the tire. In lieu of the threads 20, 22, other connection types are also conceivable.

In the filling conduit 14, a filling valve 24 is provided, which includes a shut-off element 26 and which, when a pressure medium loading occurs, is moved into an open position by a filling pressure that is present in the filling conduit 14 (see FIG. 1c), in which position, pressure medium that is introduced via the valve inlet 16 can flow to the valve outlet 18 and from there, into the inside of the tire. When the filling pressure is discontinued, the shut-off element 26 of the filling valve 24 is pushed into its closed position on the one hand by the tire pressure that is present at the valve outlet 18 and on the other hand by a spring device 28.

In addition, an emptying conduit 30, which is separated from the filling conduit 14 in a pressure-tight manner, is formed in the valve body 12 and includes an emptying valve 32, and from this emptying conduit 30, an emptying opening 34 leads through the valve body 12 to the outside. The emptying valve 32 includes a shut-off element 36, which, similar to the shut-off element 26, is pushed into a closed position by the tire pressure that is present in the region of the valve outlet 18. A spring device 38 also pushes the shut-off element 36 into the closed position. In FIG. 1, the spring device 28 is depicted as stiffer in comparison to the spring device 38, which is intended to show that the emptying valve 32 can be opened more easily than the filling valve 24 simply because of the lower spring force.

The shut-off element 36, together with a corresponding shut-off element 40, is connected by means of a coupling element 42 to an elastic diaphragm 44. The elastic diaphragm 44 constitutes a part of the wall sections in the valve body 12 that separate the emptying conduit 30 from the filling conduit 14 in a pressure-tight manner. In the example shown in FIG. 1, the pressure-tight separation between the emptying conduit 30 and the filling conduit 14, in addition to the elastic diaphragm 44, is also formed by a wall 46 extending through the filling conduit 14 (it should be noted that the tire valve 10 has a circular cross-section and the wall 46 therefore extends in the depth direction of the drawing). The elastic diaphragm 44 attached to the wall 46 is therefore approximately semicircular in shape. It can be deformed by pressure in the filling conduit 14 (see FIGS. 1b and 1c) and with a corresponding pressure medium loading, is able to move the shut-off element 36 and the corresponding shut-off element 40 between a first closed position, an open position, and a second closed position.

The first closed position corresponds to the state shown in FIG. 1a, in which a normal pressure is present in the filling conduit 14 (e.g. a pressure that corresponds to atmospheric pressure). In this position, the valve opening of the emptying valve 32 is closed by the shut-off element 36 and the elastic diaphragm 44 is not deformed since there is little or no pressure medium loading.

If an emptying pressure is applied in the filling conduit 14, then this deforms the elastic diaphragm 44 and moves the shut-off element 36 and the corresponding shut-off element 40 into an open position in which neither the shut-off element 36 nor the corresponding shut-off element 40 closes the valve opening of the emptying valve 32. This corresponds to the state shown in FIG. 1b. Since the pressure medium loading surface of the elastic diaphragm 44 is several times larger than the pressure medium loading surface of the shut-off element 26 of the filling valve 24, the emptying pressure that is applied in the filling conduit 14 exerts a greater force on the elastic diaphragm 44 than it does on the shut-off element 26 of the filling valve 24. When an emptying pressure in the filling conduit 14 is applied, the emptying valve 32 can therefore be opened while the filling valve 24 continues to remain closed in this state. The arrows v shown in FIG. 1b indicate that pressure medium contained in the tire is passing through the emptying valve 32 and flowing through the emptying conduit 30 and out the emptying opening 34 to the outside. This reduces the tire pressure.

If an even higher pressure is applied in the filling conduit 14, which corresponds to the pressure level of the filling pressure, then this deforms the elastic diaphragm 44 even further so that now, the corresponding shut-off element 40 closes the valve opening of the emptying valve 32. The emptying valve 32 is thus brought into the second closed position. At the same time, the filling valve 24 is moved into its open position so that a filling of the tire can take place. This state is shown in FIG. 1c.

In the exemplary embodiment shown, the filling valve 24 and the emptying valve 32 are embodied, for example, as ball check valves. It is understood, however, that any other suitable valve types can also be used, for example disc check valves. It is also understood that instead of the elastic diaphragm 44, other elements that can be moved by means of pressure medium loading in the filling conduit 14 can be used. For example, it is conceivable, instead of the elastic diaphragm 44, to use a piston that is situated between the wall 46 and the inner wall of the valve body 12 and is able to slide along these walls in such a way that the emptying valve 32 is moved between the first closed position, the open position, and the second closed position.

The components that are required for producing the emptying pressure or filling pressure in the filling conduit 14 are depicted in a very schematic form in FIG. 1. A control unit 48 is indicated, which can, for example, be a vehicle-mounted control unit of a vehicle-mounted pressure medium supply unit. The control unit is connected via a signal line 50 to a combined pressure/temperature sensor 52, which is positioned in the region of the valve outlet 18 of the tire valve 10. The connection between the signal line 50 and the tire valve 10 is produced by means of a signal line connector 54, which is located in the region of the thread 20 on the valve inlet 16 of the tire valve 10. The signal line connector 54 can be embodied in such a way that it comes into contact with a corresponding contact of the pressure medium line when the pressure medium line is properly connected to the tire valve 10. The combined pressure/temperature sensor 52 is connected to the signal line connector 54 by means of a line 56 that is routed in the valve body 12. The signal line 50 is an electrical line that is suitable for transmitting control signals and data and also for supplying power.

The control unit 48 can process the measurement data detected by the combined pressure/temperature sensor 52 and can determine whether a pressure adaptation in the tire is advantageous. If a tire pressure increase is required, the control unit 48 can trigger a compressor, e.g. provided in the vehicle 58, to compress pressure medium to a level of the filling pressure and convey it via the pressure medium line and tire valve 10 into the tire. Alternatively, the control unit 48 can also trigger a supply of pressure medium from a pressure reservoir 60 provided in the vehicle. If a tire pressure reduction is required, the control unit 48 can trigger the compressor 58 or pressure reservoir 60 to convey pressure medium at a level of the emptying pressure into the tire valve 10, and to open the emptying valve 32 and discharge pressure medium from the tire in a controlled manner.

In the exemplary embodiment in FIG. 1, when the tire is being emptied, it is basically necessary, for the duration of the emptying procedure, to maintain the pressure that is present in the filling conduit 14 at the pressure level or in the pressure range of the emptying pressure in order to hold the emptying valve 32 in an open position and thus to enable a continuous discharge of pressure medium from the tire. In addition, the pressure level of the emptying pressure is significantly lower than the pressure level of the filling pressure because the pressure medium loading surface of the elastic diaphragm 44 is significantly larger than the pressure medium loading surface of the shut-off element 26. This means that a comparatively low pressure is required for emptying the tire. With conventional pressure sources such as a compressor 58 or pressure reservoir 60 provided in the vehicle, however, it is generally difficult to produce the uniform pressure medium supply at a consistently low pressure level that is required for maintaining the emptying pressure. For this reason, a pressure-reducing device 62 is also used, which correspondingly reduces the higher pressure that is produced by the compressor 58 or that is present in the pressure reservoir 60. When the tire is emptied, the pressure-reducing device 62 can be switched on by the control unit 48 and can reduce the higher pressure to a stable level of a desired emptying pressure. When the tire is filled, however, the pressure-reducing device 62 does not need to be activated. A controlled filling and emptying of the tire can therefore take place even if the compressor 58 and/or the pressure reservoir 60 are not able to produce precise pressure levels, in particular stable, low pressure levels, for the emptying pressure.

Figure 2C:
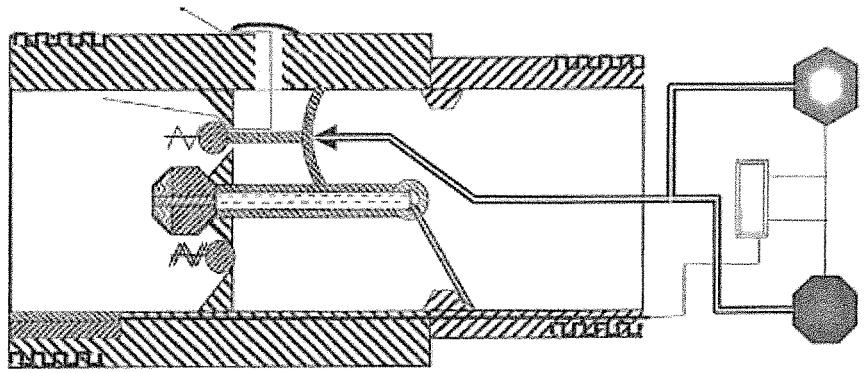
FIG. 2c shows a third schematic sectional views of a tire valve in which an electromagnetically actuatable switchover device can selectively shut off a pressure medium loading of the filling valve or of the movable element.
Figure 2B:
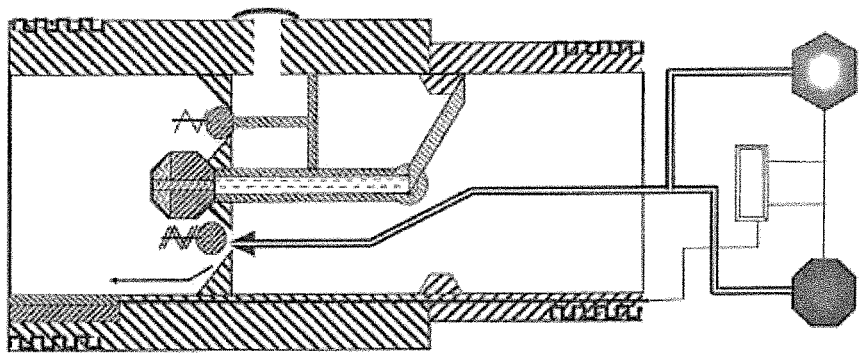
FIG. 2b shows a second schematic sectional views of a tire valve in which an electromagnetically actuatable switchover device can selectively shut off a pressure medium loading of the filling valve or of the movable element.
Figure 2A:
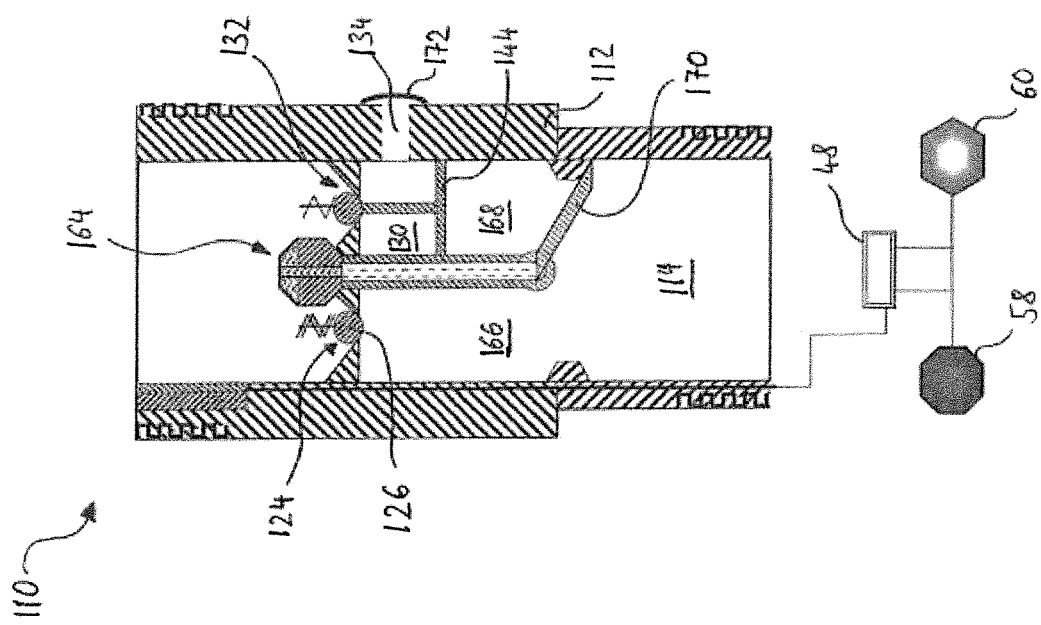
FIG. 2a shows a first schematic sectional views of a tire valve in which an electromagnetically actuatable switchover device can selectively shut off a pressure medium loading of the filling valve or of the movable element.

FIG. 2 shows a schematic sectional view of a tire valve 110 according to a second exemplary embodiment. This exemplary embodiment differs from the first exemplary embodiment essentially by virtue of the fact that instead of the corresponding shut-off element 140, an electromagnetically actuatable switchover device 164 performs the function of a shut-off device, which holds the emptying valve 132 in a closed position when the filling valve 124 assumes an open position. The electromagnetically actuatable switchover device 64 is equipped to selectively prevent a pressure medium loading of the filling valve 124 or a pressure medium loading of the elastic diaphragm 144. For this purpose, the filling conduit 114 is divided into a first part 166 associated with the filling valve 124 and second part 168 associated with the elastic diaphragm 144. The electromagnetically actuatable switchover device 164 includes a pivotable flap 170, which selectively shuts off the first part 166 or the second part 168 of the filling conduit 14 and closes it off from the respective other part in a pressure-tight manner. If the valve body 112 has a circular cross-section, then the pivotable flap 170 can have an approximately semicircular shape. Basically, though, it is also conceivable to embody the tire valve 110 with a noncircular cross-section, for example a rectangular cross-section. In this case, the pivotable flap 170 can basically be rectangular in shape.

FIG. 2b shows the state during the filling of the tire. In this state, the pivotable flap 170 is pivoted to the right side by the electromagnetically actuatable switchover device 164 and thus prevents a pressure medium loading of the elastic diaphragm 144, thus preventing the emptying valve 132 from being able to open. By means of the control unit 48 and the compressor 58 and/or the pressure reservoir 60, a filling pressure is then produced and conveyed into the tire valve 110. The accompanying pressure increase in the filling conduit 114 moves the filling valve 124 into an open position as a result of which pressure medium travels into the tire.

FIG. 2c shows the state during the emptying of a tire. In this state, the pivotable flap 170 is pivoted to the left side by the electromagnetically actuatable switchover device 164 and thus prevents a pressure medium loading of the shut-off element 126 of the filling valve 124, thus preventing the filling valve 124 from being able to open. The pressure medium conveyed into the filling conduit 114 produces a deformation of the elastic diaphragm 144, thus moving the emptying valve 132 into an open position as a result of which, pressure medium is discharged from the tire to the outside via the emptying conduit 130 and the emptying opening 134.

The control unit 48 can trigger the electromagnetically actuatable switchover device 164 as needed in order to correspondingly switch the pivotable flap 170 for the filling or emptying of the tire. To this end, the switchover device 164, like the combined pressure/temperature sensor 152, is connected to the signal line connector 154 by means of a line that is routed in the valve body 112 (not shown separately here).

In comparison the first exemplary embodiment, the use of an electromagnetically actuatable shut-off device has the particular advantage that instead of using different pressure levels for the emptying pressure and the filling pressure, it is basically possible to use the same pressure for the filling and emptying of the tire. This pressure can, for example, be the filling pressure, which as a rule, can be reliably produced by conventional compressors or pressure reservoirs. Consequently, a pressure-reducing device 162 is therefore not required in this embodiment.

In FIG. 2, a covering diaphragm 172 is also positioned on the outside of the emptying opening 134 in order to prevent dirt particles from penetrating into the emptying conduit 130. Instead of the covering diaphragm 172, a filter could also be positioned in the emptying opening 134. In the present case, the diaphragm 172 is only depicted in the second exemplary embodiment. It is understood, however, that such a diaphragm (and/or such a filter) can also be used in the other embodiments described above.

Figures 3A, 3B, 3C:
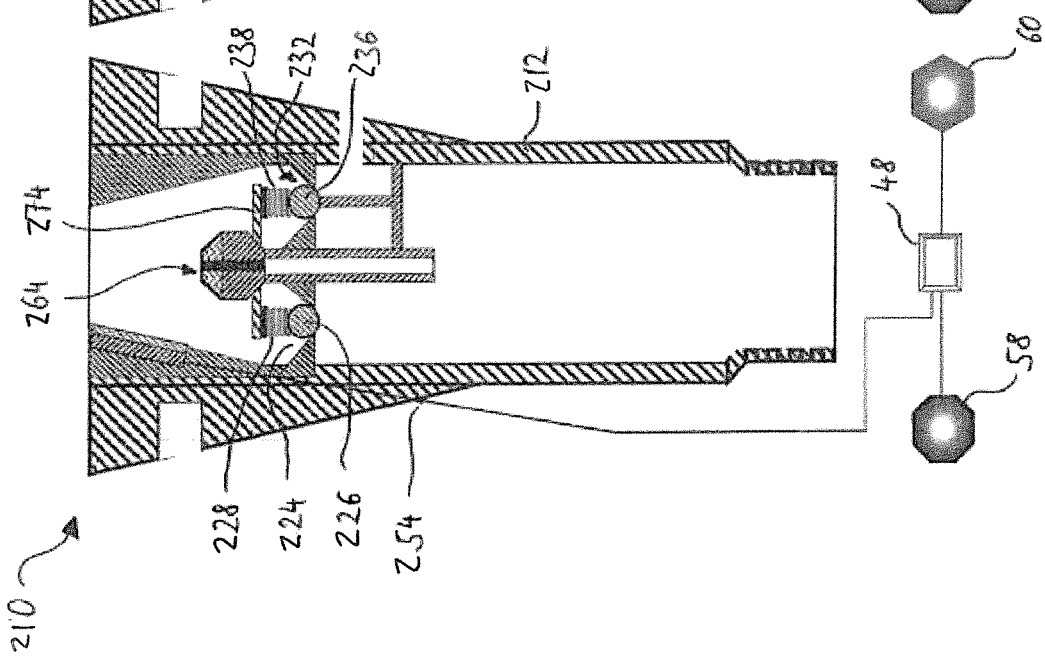
FIG. 3a shows a first schematic sectional views of a tire valve in which an electromagnetically actuatable switchover device can selectively boost the closing force of the filling valve or the closing force of the emptying valve.
FIG. 3b shows a second schematic sectional views of a tire valve in which an electromagnetically actuatable switchover device can selectively boost the closing force of the filling valve or the closing force of the emptying valve.
FIG. 3c shows a third schematic sectional views of a tire valve in which an electromagnetically actuatable switchover device can selectively boost the closing force of the filling valve or the closing force of the emptying valve.

FIG. 3 shows a schematic sectional view of a tire valve 210 according to a third exemplary embodiment. This exemplary embodiment differs from the second exemplary embodiment basically by virtue of the fact that instead of the pivotable flap 270, the electromagnetically actuatable switchover device 264 includes a rocker 274, which can be selectively set to boost either the closing force of the filling valve 224 or the closing force of the emptying valve 232. In order to boost the closing force of the emptying valve 232, the actuation of the electromagnetically actuatable switchover device 264 inclines the rocker 274 in such a way that it compresses the spring device 238 coupled to the shut-off element 236 of the emptying valve 232 and thus boosts the spring force acting on the shut-off element 236. This situation is shown in FIG. 3b. In order on the one hand, to increase the closing force of the filling valve 224, the electromagnetically actuatable switchover device 264 can pivot the rocker 274 so that it compresses the spring device 228 coupled to the shut-off element 226 of the filling valve 224 and thus boosts the spring force acting on the shut-off element 226. This situation is shown in FIG. 3c. FIG. 3a shows the rocker in the unactuated, unpivoted state. In this position, the rocker 274 is not inclined in either of the two directions so that neither a boosting of the closing force of the filling valve 224 nor a boosting of the closing force of the emptying valve 232 takes place.

In order to hold the emptying valve 232 in a closed position during the filling of the tire or in order to hold the filling valve 224 in a closed position during the emptying of the tire, the control unit 48 can trigger the electromagnetically actuatable switchover device 264 as needed in order to produce a corresponding inclination of the rocker. In FIG. 3, the signal line connector 254, by contrast with the exemplary embodiments above, is positioned on a lateral outer wall of the valve body 212.

FIG. 4 shows a schematic sectional view of a tire valve 310 according to a fourth exemplary embodiment. This exemplary embodiment differs from the third exemplary embodiment primarily in that instead of the rocker 374, the electromagnetically actuatable switchover device 364 includes a locking element 376 that can be selectively equipped either to lock the shut-off element 326 of the filling valve 324 in a closed position or to lock the shut-off element 336 of the emptying valve 332 in a closed position.

Figure 4C:
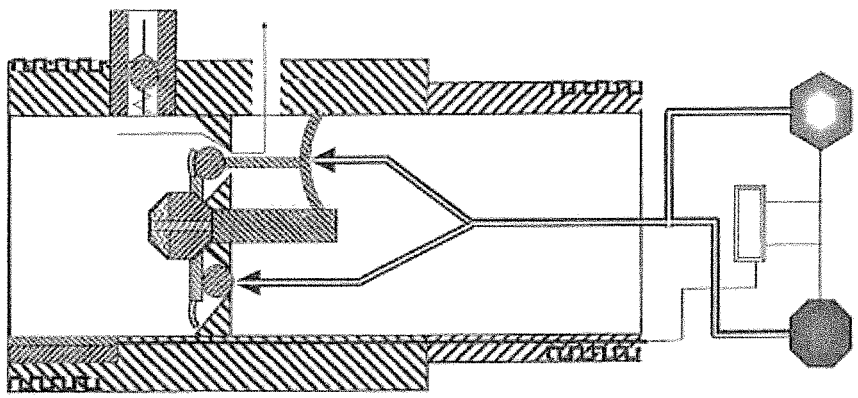
FIG. 4c shows a third schematic sectional views of a tire valve in which an electromagnetically actuatable switchover device can selectively lock the shut-off element of the filling valve or the shut-off element of the emptying valve.
Figure 4B:
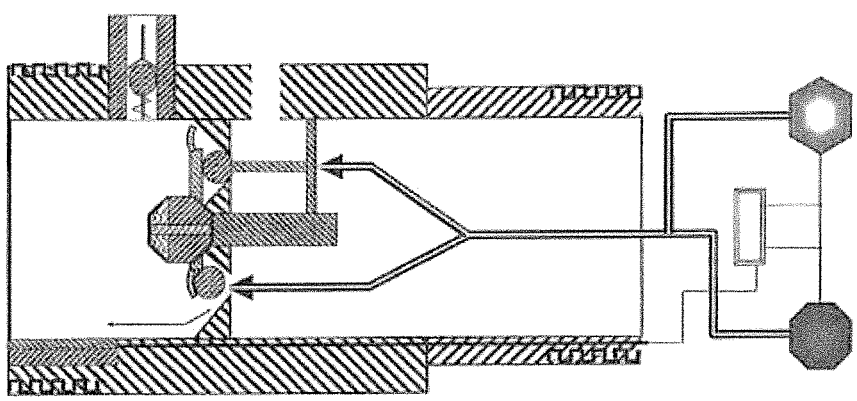
FIG. 4b shows a second schematic sectional views of a tire valve in which an electromagnetically actuatable switchover device can selectively lock the shut-off element of the filling valve or the shut-off element of the emptying valve.
Figure 4A:
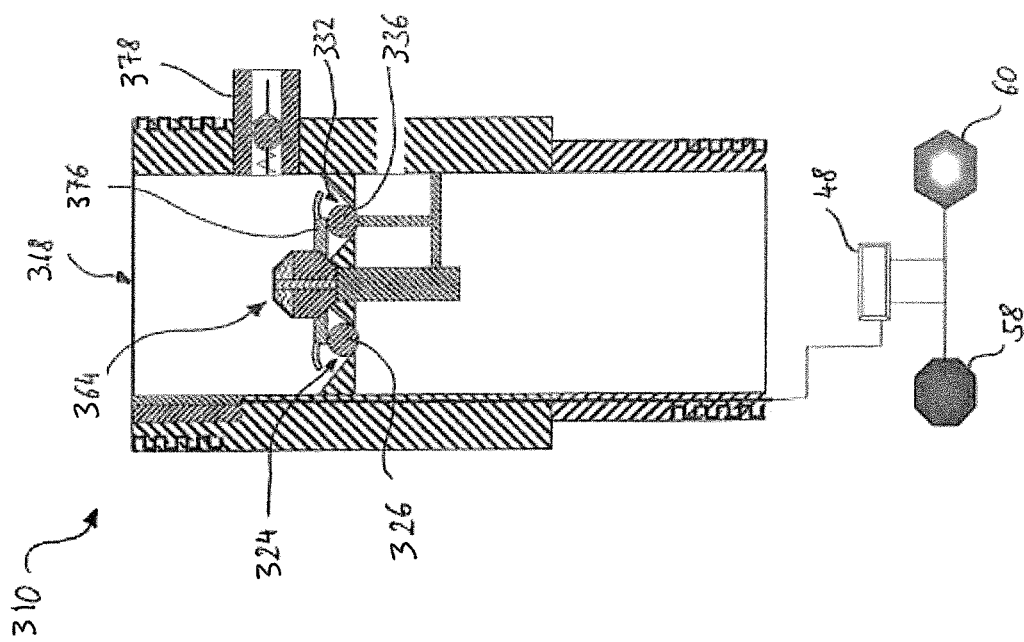
FIG. 4a shows a first schematic sectional views of a tire valve in which an electromagnetically actuatable switchover device can selectively lock the shut-off element of the filling valve or the shut-off element of the emptying valve.

In order to produce a corresponding locking action, the control unit 48 can trigger the electromagnetically actuatable switchover device 364 as needed to extend the locking element 376 either over the shut-off element 326 or over the shut-off element 336 in order to bring the locking element 376 into locking contact with the respective shut-off element and to thus lock the latter in position. When one of the shut-off elements is locked, the respective other shut-off element is simultaneously released. The normal state is once again shown in FIG. 4a, while the filling state of the tire is shown in FIG. 4b and the emptying state of the tire is shown in FIG. 4c.

In the region of the valve outlet 318, FIG. 4 also shows a connection 378 that can be in embodied the form of a conventional tire valve and for example in the event of a failure of the vehicle-mounted pressure medium supply unit, can be used to refill the pressure in the tire in the conventional way. In the present case, the connection 378 is only shown in the fourth exemplary embodiment. It is understood, though, that such a connection can also be used in the other embodiments described herein.

Figure 5C:
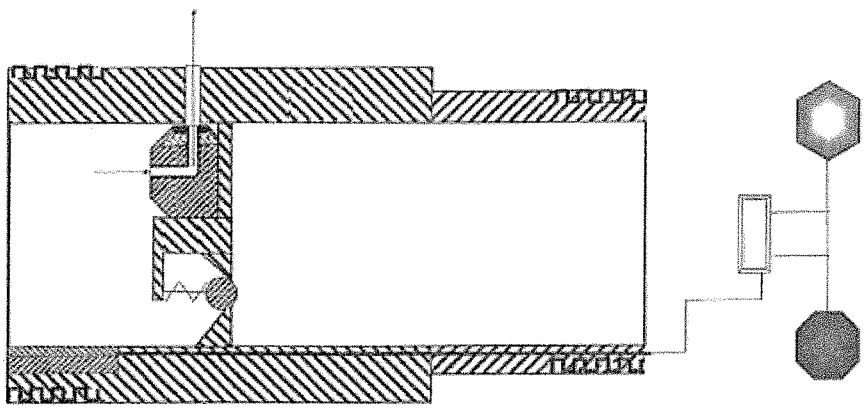
FIG. 5c shows a third schematic sectional views of a tire valve in which an electromagnetically actuatable switching mechanism can selectively close or open an emptying opening situated in the valve body.
Figure 5B:
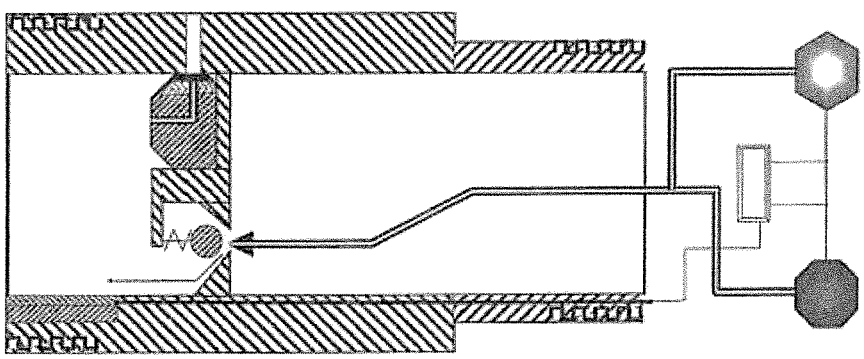
FIG. 5b shows a second schematic sectional views of a tire valve in which an electromagnetically actuatable switching mechanism can selectively close or open an emptying opening situated in the valve body.
Figure 5A:
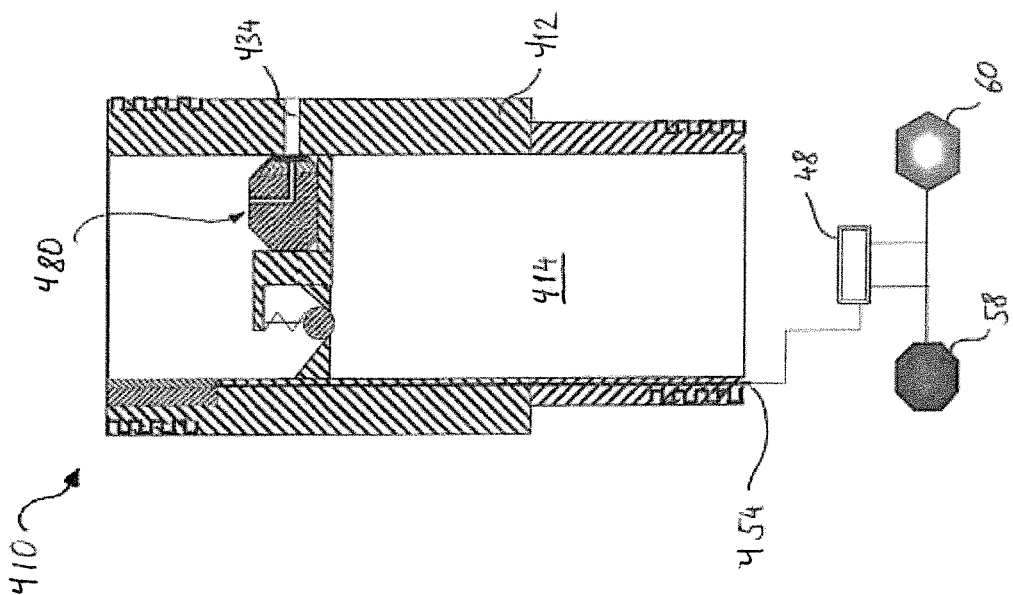
FIG. 5a shows a first schematic sectional views of a tire valve in which an electromagnetically actuatable switching mechanism can selectively close or open an emptying opening situated in the valve body.

And finally, FIG. 5 shows a schematic sectional view of a tire valve 410 according to a fifth exemplary embodiment. This exemplary embodiment differs from the preceding exemplary embodiments basically in that there is no separate emptying conduit 430 that is separated from the filling conduit 414 in a pressure-tight manner. In this case, the emptying opening 434 that leads through the valve body 412 to the outside is provided in a region of the tire valve 410, which communicates with the inside of the tire or is connected to it in a fluid-carrying manner. The tire valve 410 also includes an electromagnetically actuatable switching mechanism 480, which is equipped to selectively close or open the emptying opening 434 that leads to the outside so that pressure medium contained in the tire can be discharged in a controlled manner.

Like the above-described electromagnetically actuatable switchover device 464, the electromagnetically actuatable switching mechanism 480 is also connected to the signal line connector 454 by means of a line that is routed in the valve body 412 (not shown separately here) in order to be triggered by the control unit 48 as needed. In comparison to the preceding exemplary embodiments, no pressure increase in the filling conduit 414 is required in order to empty the tire; instead, it is sufficient for the control unit 48 to actuate the switching mechanism 80 in order to temporarily open the emptying opening 434. The electromagnetically actuatable switching mechanism 80 can, for example, be embodied in the form of a solenoid valve.

The invention claimed is:

1. A tire valve for controlled filling and emptying of a tire, comprising:
    a valve body and a filling conduit, which is routed in the valve body from a valve inlet to a valve outlet and in which a filling valve is provided;
    an emptying conduit, which is separated from the filling conduit in a pressure-tight manner, formed in the valve body, the emptying conduit including an emptying valve, and from which emptying conduit, an emptying opening leads through the valve body;
    a shut-off element of the emptying valve coupled to a movable element, the shutoff element positioned at a first end of the emptying conduit that is disposed toward the valve outlet, and the movable element positioned at a second end of the emptying conduit that is disposed toward the valve inlet, and the movable element movable by way of pressure medium loading in the filling conduit from the valve inlet, and the shut-off element coupled to the movable element in such a way that a movement of the movable element, which is brought about by way of pressure medium loading in the filling conduit from the valve inlet, moves the shut-off element of the emptying valve into an open position.

2. The tire valve according to claim 1, wherein the movable element has a greater pressure medium loading area than a shut-off element of the filling valve.

3. The tire valve according to claim 1, wherein the movement of the movable element is actuated by the pressure medium loading in the filling conduit and results from a deformation or a displacement of the movable element.

4. The tire valve according to claim 3, wherein the movable element is an elastic diaphragm or a piston which separates the emptying conduit from the filling conduit in a pressure-tight manner.

5. The tire valve according to claim 1, wherein the emptying valve and/or the filling valve are/is configured as a check valve.

6. The tire valve according to claim 1, wherein the tire valve comprises a shut-off device which is configured to hold the emptying valve in a closed position if the filling valve assumes an open position, and/or to hold the filling valve in a closed position if the emptying valve assumes an open position.

7. The tire valve according to claim 6, wherein the shut-off device comprises a corresponding shut-off element for the emptying valve, which corresponding shut-off element is coupled to the movable element in such a way that a movement of the movable element which is brought about by way of pressure medium loading in the filling conduit, moves the corresponding shut-off element of the emptying valve into a closed position if the pressure medium loading is greater than the pressure medium loading that opens the emptying valve.

8. The tire valve according to claim 6, wherein the shut-off device comprises an electromagnetically actuatable switchover device which is configured to hold the emptying valve in a closed position if the filling valve assumes an open position and/or to hold the filling valve in a closed position if the emptying valve assumes an open position.

9. The tire valve according to claim 8, wherein the electromagnetically actuatable switchover device is configured to selectively shut off a pressure medium loading of the filling valve or a pressure medium loading of the movable element.

10. The tire valve according to claim 8, wherein the electromagnetically actuatable switchover device is set up to selectively boost a closing force of the filling valve or a closing force of the emptying valve.

11. The tire valve according to claim 8, wherein the electromagnetically actuatable switchover device is configured to selectively lock the filling valve shut-off element in a closed position or the emptying valve shut-off element in a closed position.

12. The tire valve according to claim 1, wherein the tire valve has a signal line connector for connection to a signal line.

13. The tire valve according to claim 12, wherein the signal line connector is adjacent the valve inlet and is configured to be connected automatically to a signal line, which is routed in a pressure medium line, during the connecting operation between the tire valve and the pressure medium line.

14. The tire valve according to claim 12, further comprising an electromagnetically actuatable switchover device or an electromagnetically actuatable switching mechanism is connected to the signal line by the signal line connector.

15. The tire valve according to claim 12, wherein the tire valve includes a sensor adjacent the valve outlet and connected to the signal line by the signal line connector.

* * * * *